(12) United States Patent
Hungerbuehler et al.

(10) Patent No.: US 6,941,400 B2
(45) Date of Patent: Sep. 6, 2005

(54) MODULAR DATA ACQUISITION SYSTEM

(75) Inventors: Viktor M. Hungerbuehler, Satigny (CH); Jean-Pierre Vittet, Lully (CH); Jean-François Goumaz, Genève (CH); Jean-Luc Bolli, Genève (CH); Yves Maumary, Genève (CH); Didier Lavanchy, Cheseaux-Noreaz (CH)

(73) Assignee: Acqiris, Plan-les-Ouates (CH)

( * ) Notice: Subject to any disclaimer, the term of this patent is extended or adjusted under 35 U.S.C. 154(b) by 513 days.

(21) Appl. No.: 09/805,827

(22) Filed: Mar. 14, 2001

(65) Prior Publication Data

US 2001/0011313 A1 Aug. 2, 2001

Related U.S. Application Data

(63) Continuation of application No. PCT/CH98/00395, filed on Sep. 15, 1998.

(51) Int. Cl.[7] .............................................. G06F 13/00
(52) U.S. Cl. ........................ 710/301; 710/302; 710/100
(58) Field of Search ................................ 710/301–304, 710/100; 711/167; 370/510, 514

(56) References Cited

U.S. PATENT DOCUMENTS

| 5,645,434 | A |   | 7/1997  | Leung |       |
|-----------|---|---|---------|-------|-------|
| 6,141,711 | A | * | 10/2000 | Shah et al.    | 710/302 |
| 6,202,109 | B1| * | 3/2001  | Salo et al.    | 710/301 |
| 6,212,580 | B1| * | 4/2001  | Ihara et al.   | 710/8   |
| 6,272,574 | B1| * | 8/2001  | Hamada         | 710/301 |
| 6,473,822 | B1| * | 10/2002 | Nakamatsu et al. | 710/300 |
| 6,493,407 | B1| * | 12/2002 | Sheafor et al. | 375/356 |
| 6,587,909 | B1| * | 7/2003  | Olarig et al.  | 710/302 |
| 6,611,905 | B1| * | 8/2003  | Grundon et al. | 711/167 |
| 2002/0080811 | A1 | * | 6/2002 | Wetzel et al. | 370/442 |

FOREIGN PATENT DOCUMENTS

| DE | 37 43 847 A1 | 7/1989 |
| EP | 0 696 005 A2 | 2/1996 |
| EP | 0 696 005 A3 | 11/1997 |
| WO | WO 97/49025  | 12/1997 |

* cited by examiner

*Primary Examiner*—Tim Vo
*Assistant Examiner*—Kim T. Huynh
(74) *Attorney, Agent, or Firm*—Pearne & Gordon LLP

(57) ABSTRACT

In a modular data acquisition system (4), a module comprises at least one analog-to-digital converter (12) for converting an analog input signal (IN1, IN2, IN3, IN4) into a digital signal (OUT1, OUT2, OUT3, OUT4), and a clock generating circuit (20) for supplying an internal clock signal (209). The module further comprises a connector for plugging in a removable connecting element (3) on the front side of the module (1) in order to connect it to a synchronization bus connecting several modules in said system.

A clock selecting circuit (204) enables the selection of either a slave-clock status, wherein the converters (12) are synchronized by an external synchronization signal supplied by said synchronization bus, or of a master-clock status, wherein the converters are synchronized by said internal clock signal which is also used a external synchronization signal on said synchronization bus. Trigger signals can also be transmitted by the synchronization bus and by the connecting elements.

30 Claims, 5 Drawing Sheets

MODULAR DATA ACQUISITION SYSTEM

This application is a continuation of PCT/CH98/00395, filed Sep. 15, 1998.

FIELD OF THE INVENTION

The present invention concerns a modular data acquisition system. The present invention concerns more particularly the synchronization of different modules in a modular acquisition system.

RELATED ART

Many types of data acquisition systems are known, for example transitory recorders and digital oscilloscopes, in which it is necessary to convert one or several analog signals into one or several digital signals capable of being stored in a digital memory and processed by a digital processor. During the past few years, modular acquisition systems have appeared, generally comprising a frame in which various acquisition modules can be inserted in parallel in slots. Each module comprises connection means for inserting and removably connecting it in the system, as well as generally one or several acquisition channels capable of digitizing the input system observed. Acquisition modules conform to the PCI, CompactPCI, VXI or PXI standards are known defining the mechanical and electrical characteristics of the intermodular connection means.

These modular acquisition systems have the advantage that the user can configure them by adding or replacing certain modules and that they can thus be adapted to the most diverse needs.

The data acquisition modules available on the market comprise generally two or four channels. Due to the limited surface available on the usual circuits, it is difficult to provide a higher number of channels without having to give up certain useful functions or without reverting to complex solutions. When a large number of acquisition channels is required for a given application, it is thus necessary to insert several modules in the acquisition system. A system with eight acquisition channels can thus for example be made by the user by fitting four acquisition modules of two channels each in the slots of a modular acquisition system.

A purpose of the present invention is to propose an improved acquisition module for a modular acquisition system. In particular, a purpose of the present invention is to improve the synchronization between acquisition channels on distinct modules.

The invention arises from the observation that in known modular acquisition systems the sampling times of the signals on the different channels are not always identical. FIG. 3 illustrates the particular case of an acquisition module having two modules, wherein the first module comprises the two channels IN1 and IN2 whereas the second module comprises the channels IN3 and IN4. Each module generally includes its own clock signal generating circuit for synchronizing the module's digitizers. It will be seen from FIG. 3 that the two signals IN1 and IN2 on the first module are sampled at the same sampling times $t_1$, $t_2$ and $t_3$. Similarly, the sampling times of the two signals IN3 and IN4 on the second module are also synchronized with one another. However, the clock signal used on the first module is different from the signal on the second module, so that the sampling times on the first module and the sampling times on the second module are phase-shifted by $\Delta t$. This phase-shift can furthermore vary with time.

This problem is naturally particularly crucial during the acquisition of very high frequency signals, for example on the order of the gigahertz, that are to be compared to one another. A phase-shift of a few nanoseconds can render certain measurements impossible or inaccurate.

Another problem which the invention aims to solve concerns the transmission of trigger signals between modules. It is for example sometimes necessary to begin the data acquisition on one determined channel only when a particular event is detected on another channel that may be implemented on another module. The data acquisition modules of the prior art generally do not allow the synchronization of channels on the trigger signals generated on another module.

The PXI system proposed notably by National Instruments allows a reference signal at 10 MHz to be distributed between different modules in an instrumentation system. This signal is distributed by the connectors plugged in the motherboard of the acquisition system, on the modules' lower side. However, this standard reference frequency is not sufficient for synchronizing digitizers operating at much higher speeds, on the order of the gigahertz for example. It would be possible to multiply on each module the frequency of the reference signal, for example by means of a phase locked loop (PLL), and to synchronize the digitizers on each module with the multiplied signal; however, the different PLL on the different modules would produce different and unpredictable phase-shifts, so that even this solution would not guarantee absolutely simultaneous sampling times.

The PXI system also provides trigger lines on the motherboard, using the module connectors that can be plugged in the slots of the motherboard. Again, the characteristics such as transmission time or maximal frequency of the signals transmitted on these lines do not allow them to be used for very high frequency applications requiring a high temporal accuracy. A bus, generally called "star trigger bus", offers higher performances, but enables only to synchronize the modules on the trigger signals generated by modules occupying predetermined slots—for example the first space after the slot containing the module system. The star trigger bus therefore does not offer the flexibility demanded by certain applications and requires the modules' place in the slots of the acquisition system to be changed in order to generate trigger signals from one channel on another module.

A purpose of the present invention is to propose a modular data acquisition system making it possible to synchronize the acquisition modules from any module and to define trigger signals on any channel without having to exchange the place of the acquisition modules in the slots and if possible by software programming.

BRIEF SUMMARY OF THE INVENTION

These purposes are achieved according to the invention by means of the elements of the various independent claims, preferred embodiments of the invention being furthermore indicated in the dependent claims.

In particular, these purposes are achieved by means of a module for modular data acquisition system, comprising connection means (for example of the type PCI, CompactPCI, PXI, VXI or according to any other suitable type) enabling the module to be removably inserted in any slot of said modular acquisition system. The module of the invention comprises at least one acquisition channel, wherein each channel comprises at least one analog-to-digital converter for converting an analog input signal into a digital signal. Each converter comprises a clock entry for a sampling frequency signal; this signal defines the converter's sampling times.

According to the invention, the module further comprises at least one clock generating circuit capable of supplying an internal clock signal. A connector placed preferably on the module's front side allows a removable connecting element to be plugged in to transmit at least one external synchronization signal on the bus connecting adjacent modules in said modular acquisition system. A clock selecting circuit permits either to connect said external synchronization signal to said clock inputs (clock slave state), or to impose on said bus said external clock signal (clock master state). In this manner, according to the master-slave selection signal applied (for example by the control processor of the acquisition system), it is possible either to use the module's internal clock generating circuit to synchronize the analog-to-digital converters and to supply an external synchronization signal derived from this internal clock signal to the other modules of the acquisition system, or to synchronize the converter with an external synchronization signal generated on another module. In a variant embodiment, it is also possible to define which module generates the external synchronization signal by means of switches on the modules or on the connecting elements.

Connecting elements for connecting separate electronic components are described in U.S. Pat. No. 5,645,434 (T. Leung). The connector described in this document makes it possible to connect superimposed "Hubs" in a computer network. This document does not describe how the connectors could also be used for connecting data acquisition modules nor does it describe any clock selecting circuit.

WO9749025 describes a data acquisition system comprising interchangeable circuits connected by the rear side to a computer bus by engagement within a slot. The circuits have on their front side a series of connectors. This document however does not describe connectors for connecting each module to a synchronization bus, nor does it describe any clock selecting circuit.

DE3743847 describes a flexible data acquisition system comprised of several computers and acquisition modules connected to the computers by a first bus. The acquisition modules can work according to their internal clock or according to a clock signal given by a computer. This document however does not describe how the acquisition modules could be directly interconnected so as to constitute a synchronization bus.

The external synchronization signal transmitted between the modules is preferably a signal directly derived from the signal generated by the internal clock generator of one of the modules and it can thus be applied to the analog-to-digital converters of the other modules. A programmable delay element makes it possible to compensate the variable transmission delays of the external synchronization signal between the modules, due to the different distances covered by the signal between the different modules. One avoids however placing an element introducing an unpredictable delay between the bus supplying the external synchronization signal and the converters of the acquisition system. In particular, one avoids in the modules of the invention the use of phase lock loops on the inputs of the external synchronization signal.

According to the invention, trigger signals are also transmitted on a bus between the modules in the acquisition system. It is possible by software programming to define which module ("trigger master") supplies a trigger signal at a given time. In a variant embodiment, it is also possible to define which modules generates the external trigger signal by means of switches on the modules or on the connecting elements.

According to the invention, the master clock signals and the trigger signals are transmitted between the modules by means of removable connecting elements plugged in on the front side of the acquisition system. Different synchronization or trigger configurations can in this way be easily defined by the user, simply by adding or removing the connecting elements.

Patent EP0318768, the contents of which are hereby incorporated by reference, describes a logical analyzer comprising several modules.

Each module comprises a sampler that can be synchronized either by an external clock signal originating from the tested apparatus, or by a clock signal generated by a clock signal generator that is common to all the modules. A multiplexer on each module makes it possible to select one of the two clock signals. The modules however do not comprise an internal clock generating circuit. This document does not suggest to transmit clock signals between the modules by means of connecting elements that are themselves removable.

U.S. Pat. No. 4,490,821 describes a system to compensate the delays due to the transmission of clock signals between distant modules in a computer of great dimensions. This document however does not pertain to the data acquisition technology.

BRIEF DESCRIPTION OF THE DRAWINGS

The invention will be better understood with the aid of the description of an embodiment of the invention given as example and illustrated by the figures showing.

DETAILED DESCRIPTION OF THE INVENTION

Figure 1:
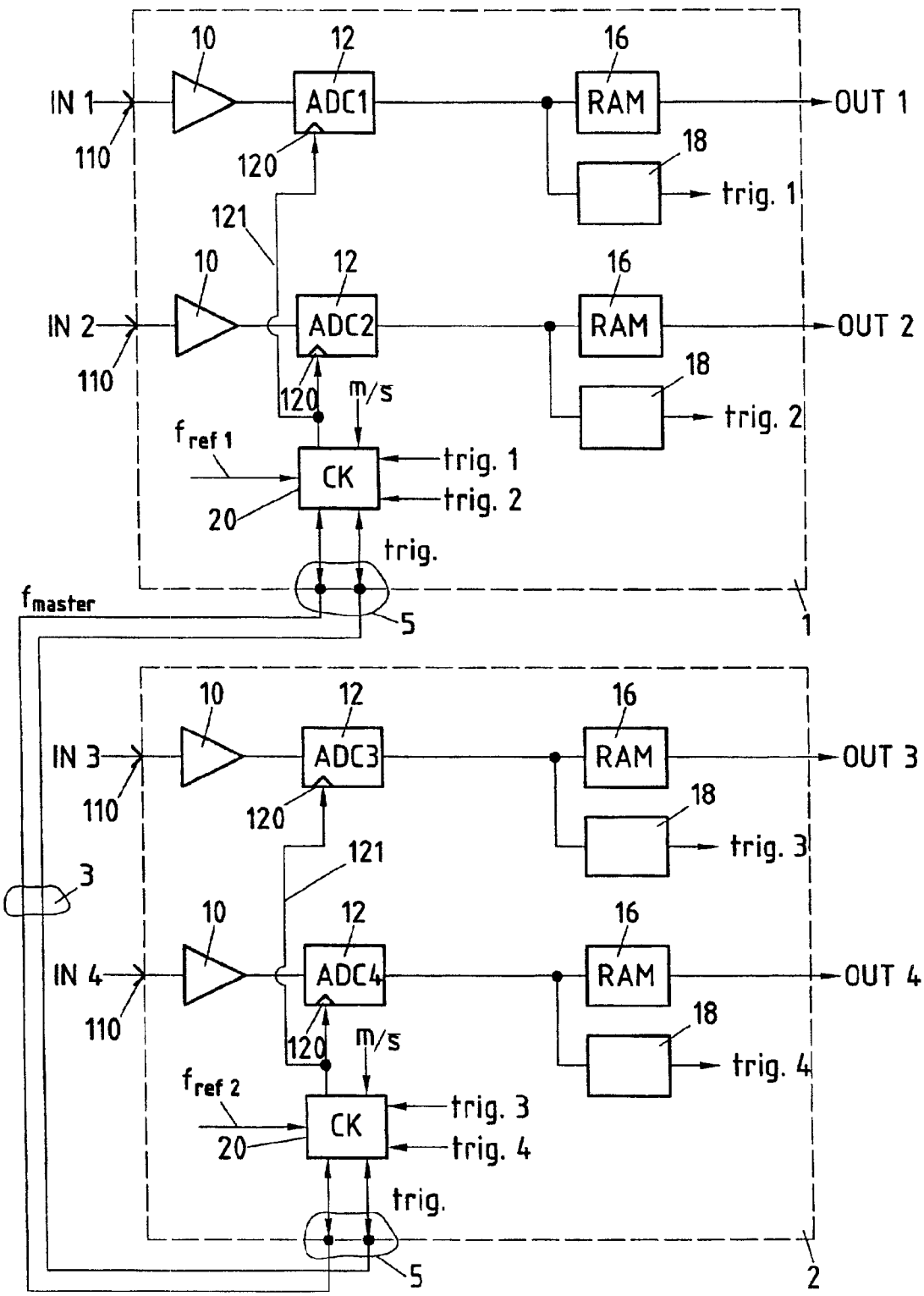
FIG. 1 a bloc diagram of two acquisition modules according to the invention, connected by a connecting element according to the invention.

FIG. 1 shows a bloc diagram, simplified for the sake of clarity, of two acquisition modules 1, 2 with two channels, connected by a connecting element according to the invention. FIG. 1 shows only those elements that are necessary to the quick grasp of the invention; the connections between the different elements of the modules have been represented in the shape of a single line, even in the case when this connection can correspond to a bus or to differential lines.

Figure 6:
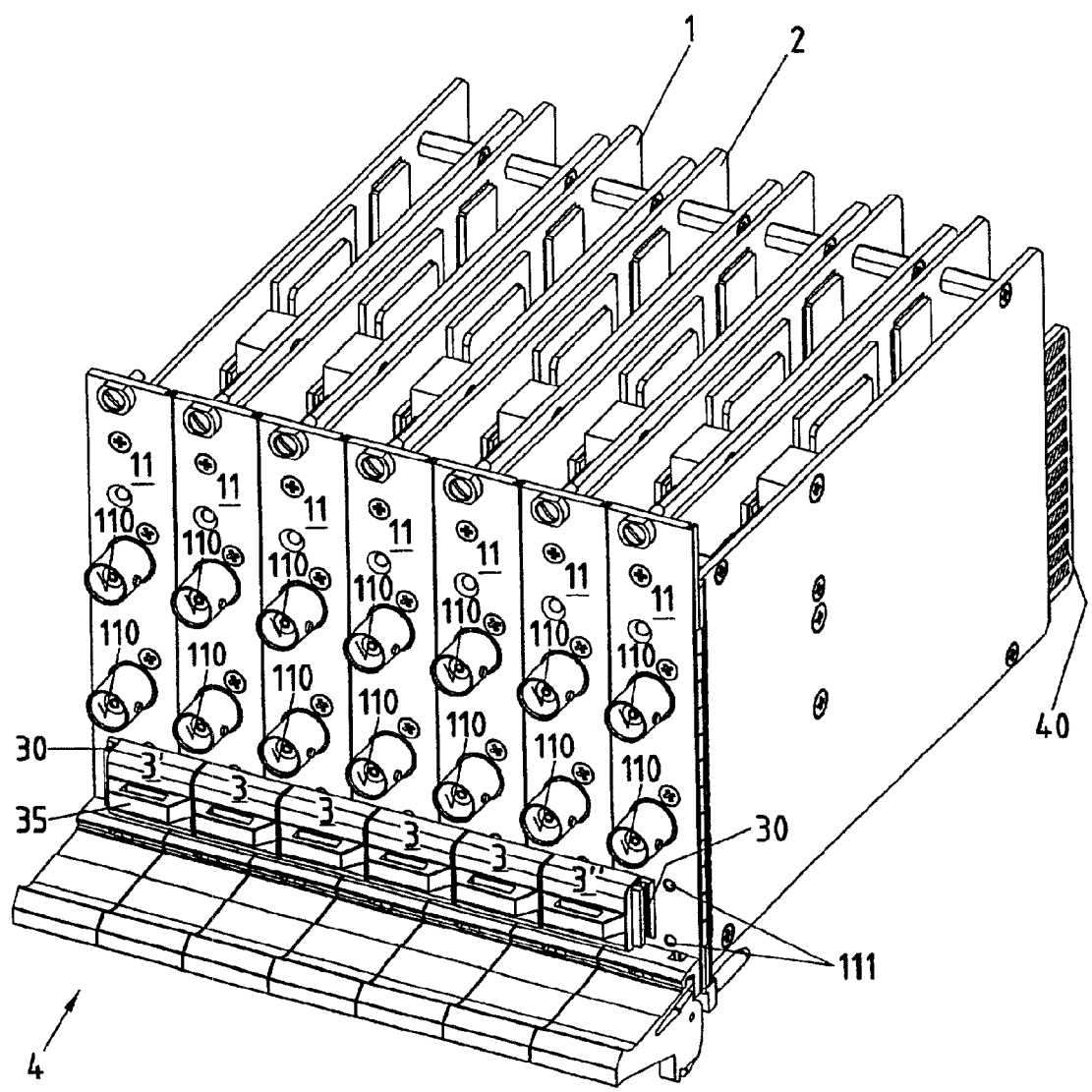
FIG. 6 a perspective representation of an acquisition system comprising several modules according to the invention.

The one skilled in the art will understand that the invention applies to an acquisition system comprising any number of modules 1, 2 comprising each any number of acquisition channels. FIG. 6 for example illustrates in perspective an acquisition system with 14 channels, being constituted of seven acquisition modules of two channels each. Each acquisition module 1, 2 comprises connecting means 40 for plugging it in and connecting it in a slot (not shown) provided on the motherboard (not shown) of the acquisition system. In the case of a standard PXI type circuit, the motherboard comprises generally eight parallel slots. The number and arrangement of the slots can however vary according to the applications and to the technology used (for example PCI, CompactPCI, PXI, VXI etc.); it is also possible to construct systems with an even greater number of modules by using bridges between two motherboards (for example, in a PCI system, by means of the so-called "PCI-to-PCI bridge") or by placing the acquisition modules in several interconnected series of slots. A digital processing system (not shown), placed for example on the motherboard or also mounted on an extension card in a slot, makes it possible to control the different acquisition modules, to process the sampled data and to store them or to display them on a display (not shown). The digital processing system is preferably constituted of a personal computer controlled for example by the operating system Windows, DOS, UNIX or LINUX or by any other appropriate operating system.

Each acquisition channel on each of the modules comprises a connector 110, for example a BNC connector, for coupling a connecting cable for the analog signal to be measured. The signal is amplified and possibly filtered by an amplification stage 10, then converted into a digital signal by an analog-to-digital converter 12 (digitizer) and stored in a RAM 16, for example a double access memory, that can be read by the aforementioned digital processing system.

Digitizers 12 are currently made that work with a sampling frequency greater than 500 MHz, for example on the order of 1 GHz or more; it is to be predicted that these current limits will be exceeded with the appearance of better performing components. These ultra-fast digitizers supply a digital word, for example an octet in the case of eight bit converters, at each flank of the sample signal 121 supplied at a clock input 120, for example each nanosecond.

The modules 1, 2 can comprise a circuit generating a trigger signal 18 associated to each channel for observing the digital signal supplied by the digitizer 12 and supplying at least a trigger signal (trig1, trig2, trig3, trig4) when a specific event occurs on this signal—for example at a zero crossover or at an extreme. The circuits 18 can preferably be controlled by the aforementioned digital processing system so as to control different types of events on each channel. The trigger signal supplied can be used to modify the operation of one or several acquisition channels—for example to stop the acquisition of data in order to visualize the acquired data just before the occurrence of a detected event, to start a new data acquisition or to modify the storing sequence of the digitized data in the RAM 16. The trigger generating circuit accesses the data directly at the output of the digitizer 12. It is also possible to make a module in which the trigger signals are supplied by the amplifiers 10, by means of comparators transforming the analog signal into a digital signal according to a comparison threshold, or a trigger circuit supplying a signal in response to an event detected for example by the digital processing system. It is also possible to conceive modules 1, 2 in which at least certain channels are deprived of a trigger generating circuit, or modules that can also be mounted in another instrument basket, effecting only the trigger generating on certain channels and thus deprived of RAM 16 on certain channels. Finally, more complex trigger circuits, detecting simultaneous events on several channels (for example a signal value on a first channel equal to the signal value on a second channel) can also be conceived.

Figure 2:
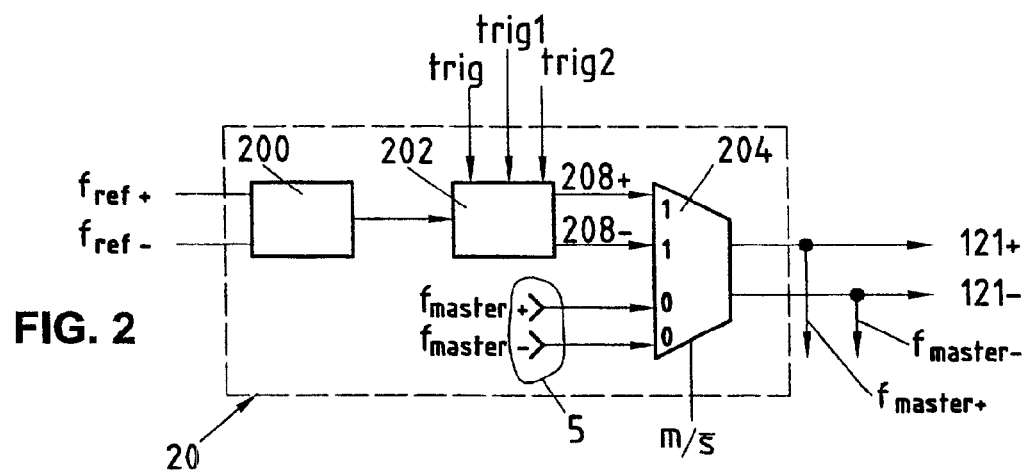
FIG. 2 a bloc diagram of a clock generating circuit and of a clock selecting circuit according to the invention.
Figure 3:
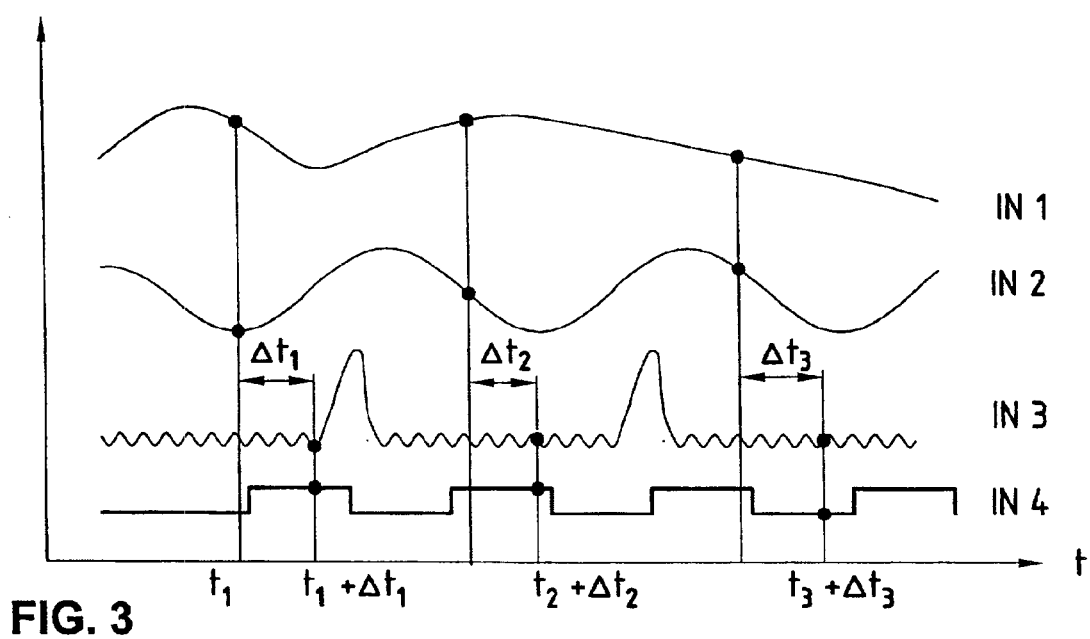
FIG. 3 a temporal diagram illustrating the problem of the phase-shift between channel sampling times on different modules in the prior art acquisition systems.

Each module comprises a clock generating circuit 20, capable of supplying an internal clock signal (FIG. 2) to the module. The clock generating circuit receives preferably a reference signal $f_{ref}$ generated for example by a quartz oscillator in the module or supplied from outside the module, for example by the motherboard, by the measured device or by a high-precision clock able to be mounted on a circuit in another slot of the acquisition system or of another instrument. The clock generating circuit 20 furthermore receives an external synchronization signal $f_{master}$ supplied by the synchronization bus according to the invention as well as internal and external trigger signals that can influence the operation of the clock generating circuit. On each module, the circuit 20 generates an internal clock signal 208 that can be used as sampling signal 121 for sampling the data in the digitizers 12. The clock signal 208 is preferably a differential signal; it can also be constituted by two signals, for example two signals phase-shifted by 90 degrees whose ascending and descending flanks can be used for sampling. As illustrated in FIG. 3, the sampling times $t_1$, $t_2$, $t_3$ of the signals on the channels IN1–IN2 (or IN3–IN4) on the same module are thus synchronized. On the other hand, in the systems of the prior art, it is not possible to synchronize the sampling times between channels on different modules.

According to the invention, the acquisition modules 1, 2 are provided with a connector 5 for plugging in a removable connecting element 3 (particularly visible on FIGS. 5 to 8) in order to connect these modules to a synchronization bus connecting several modules in the system. FIG. 2 shows diagrammatically part of the components of the clock generating circuit 20. The reference rate supplied by the aforementioned internal oscillator (not shown) or by an external oscillator is multiplied by a phase lock loop (PLL) 200, then transmitted to the clock generating logic 202 whose operation will not be detailed here. One will note the preferred use of reference signals of the differential type $f_{ref+}$, $f_{ref-}$. The clock generating logic 202 makes it possible to modify the operation of the clock signal generating circuit according to different conditions, for example according to the trigger signals trig, trig1, trig2. For example, the internal clock signal 208 can be interrupted by a command of the digital processing system or when certain trigger conditions are fulfilled.

The internal clock signals 208+, 208− supplied by the logic 202 are transmitted to a differential selecting circuit 204. The external synchronization signal $f_{master+}$, $f_{master-}$ (also preferably a differential signal) is generated at the other input of the selecting circuit 204, which supplies at the output of the clock generating circuit 20 a differential sampling signal 121+, 121− for triggering the sampling of the signals in the digitizers 12. According to the invention, a master/slave signal m/s, supplied preferably by the digital processing system through the connections 40 (FIG. 6) enables to chose in the selecting circuit 204 either the slave-clock state, in which the digitizers 12 are synchronized by the external synchronization signal $f_{master+}$, $f_{master-}$ supplied by said synchronization bus, or a master-clock state in which these digitizers are synchronized by the internal clock signal 208+, 208−. In the latter case, the internal clock signal 208+, 208− is also used as external synchronization signal on said synchronization bus and thus makes it possible to synchronize the digitizers 12 on other modules placed in slave-clock state.

Figure 4:
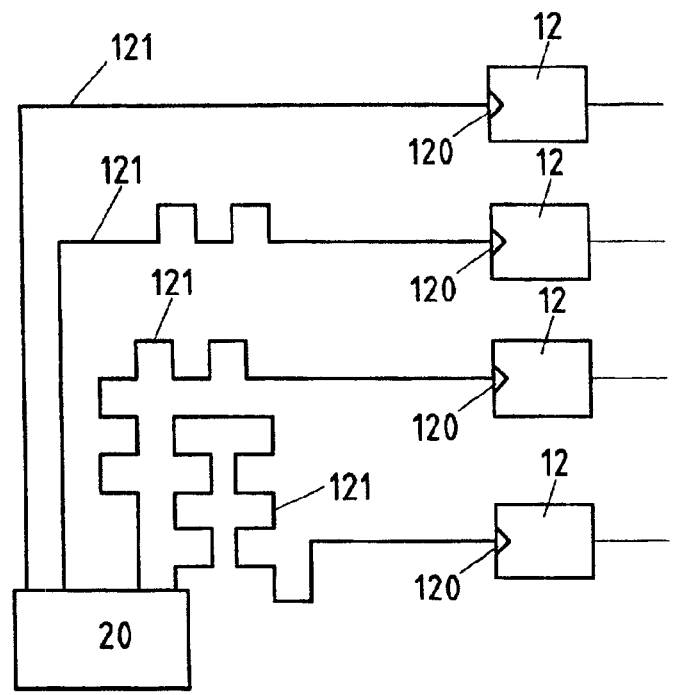
FIG. 4 a diagrammatic representation of the connection of the sampling clock signal.

FIG. 4 shows diagrammatically the coupling between the clock generating circuit 20 and the different analog-to-digital converters 12 on the module, in the case of a four-channel module. The converters 12 are generally aligned on the module, in the manner illustrated schematically in FIG. 1. The distance between the clock generating circuit 20 and the different converters is thus necessarily different, so that the transmission time of the sampling signal 121 to the converters is different. In a very high-frequency acquisition system, the phase-shift thus introduced can be unacceptable. In order to compensate it, one will preferably make connections by means of non-rectilinear paths on the module, so as to connect all the digitizers 12 to the circuit 20 by means of paths of the same length.

Figure 5:
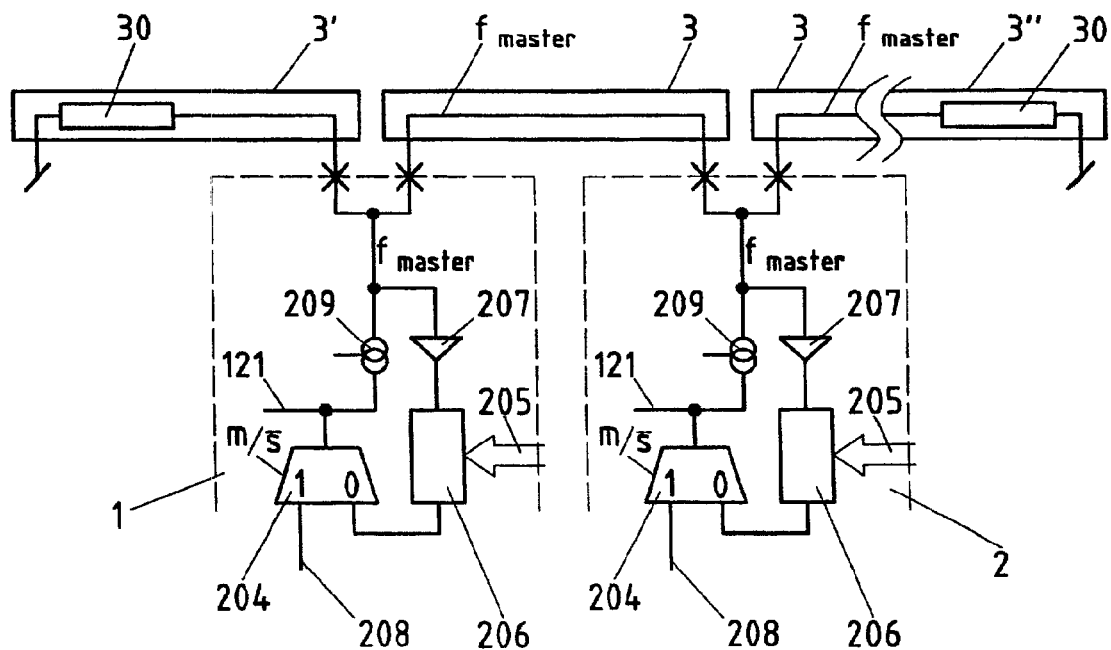
FIG. 5 a diagrammatic representation of the connection of synchronization signals between adjacent modules by means of the bus of the invention.

FIG. 5 shows diagrammatically the connection of adjacent modules 1, 2 by means of a synchronization bus according to the invention. The external synchronization signal received from the bus on the connector 5 is amplified by an amplifier 207, then crosses a digital delay line 206 that can be programmed by means of programming lines 205. The delay introduced by the delay line 206 can be adjusted by the digital processing system so as to compensate the different delays introduced by the transmission of the external synchronization signal on the synchronization bus. An appropriate program modifies the delay introduced by the delay line 206 according to the place occupied by the module in the acquisition system and to the distance to the clock master module generating the external synchronization signal. When the clock master module changes, it is necessary to reprogram the delays introduced by the delay lines in the different modules. In order to adjust the delay more finely, the digital delay line 205 can be completed or replaced by an analog delay line which allows a more accurate phase-shift compensation. The synchronization signal thus delayed is transmitted to the selecting circuit 204 and finally selected by means of the signal m/s for synchronizing the digitizers 12 of the module.

In the case where the module 1 in question functions as clock master, the (differential) internal clock signal 208 selected by the selecting circuit 204 is preferably supplied to a controlled power source 209.

The different modules are connected two by two by means of connecting elements 3 capable of being plugged in the connectors 5 of the acquisition modules. Each connecting element permits a module to be connected to its immediate neighbor in the acquisition system. The (differential) external synchronization signal $f_{master}$ is thus transmitted along a bus traversing each connecting element 3 and each connected module 1, 2, without passing directly from one connecting element 3 to its neighbor. The last connecting elements 3', 3" at each extremity of the bus, i.e. connected with the modules occupying the external positions in the modular acquisition system, are equipped of a terminating impedance 30, preferably a resistance connected between each line of the bus and the earth and whose value corresponds to the impedance of the bus line, preferably 50 Ohms.

Although the simplified diagrams of the FIGS. 2 to 5 show only the transmission of the external synchronization signal $f_{master}$ between different acquisition modules, at least one trigger signal is preferably also transmitted between the modules through the same connectors 5 and the same connecting elements 3. Similarly, a selecting circuit (not shown) controlled by the digital processing system allows on each module the choice between an external trigger signal (transmitted on the bus) or a trigger signal generated on the module and makes it possible to determine which channel on which module fulfils the trigger master function. The choice of the channel used for generating the external trigger signal can thus be made by programming, without it being necessary to move the modules or the connecting elements. It is also possible to carry several trigger lines through the connecting elements 3 and to define by programming (or, in a variant embodiment, also through switches, on the modules or on the connecting elements 3, 3', 3") which module generates the trigger signal on each available line. Preferably, the trigger signals are also differential signals.

FIG. 6 shows in perspective an acquisition system comprising several acquisition modules 1, 2 side by side connected by the connecting elements 3, 3', 3" plugged in on the front side of the modules and enabling an external synchronization signal and one or several trigger signals to be transmitted between the modules. One sees in particular in this Figure the different embodiment of the connecting elements 3' and 3" occupying the two extremity slots; the shape of these connecting elements, which contain the aforementioned terminating impedances, does not allow them to be inserted in the middle of the bus, between two other connecting elements 3. In the cases of an acquisition system constituted only of two acquisition modules, one will use preferably a connecting element comprising for each bus line two terminating impedances and whose shape does not allow it to be inserted in a position adjacent to another terminating element.

An acquisition system can comprise, besides one or several acquisition modules, modules fulfilling different functions. For example, it is possible in the framework of this invention to make an acquisition system comprising clock modules allowing only an external synchronization signal $f_{master}$ and possibly a reference signal $f_{ref}$ to be supplied to the other modules, or comprising trigger modules aiming only to detect specific events on the acquisition channels and to supply corresponding trigger signals to the modules, through the synchronization bus of the invention.

The position of the connectors 5 on the front side of the modules 1, 2 makes it possible to insert and remove very easily the connecting elements 3, without having to remove the modules from their slots. It is thus possible to modify very easily the configuration and to remove the external synchronization of certain modules, and to then visually check the chosen configuration. In a variant embodiment, indicator lights (not shown) on each module and/or on the connecting elements further allow an indication as to which modules currently occupies the function of clock master or trigger master.

Figure 7:
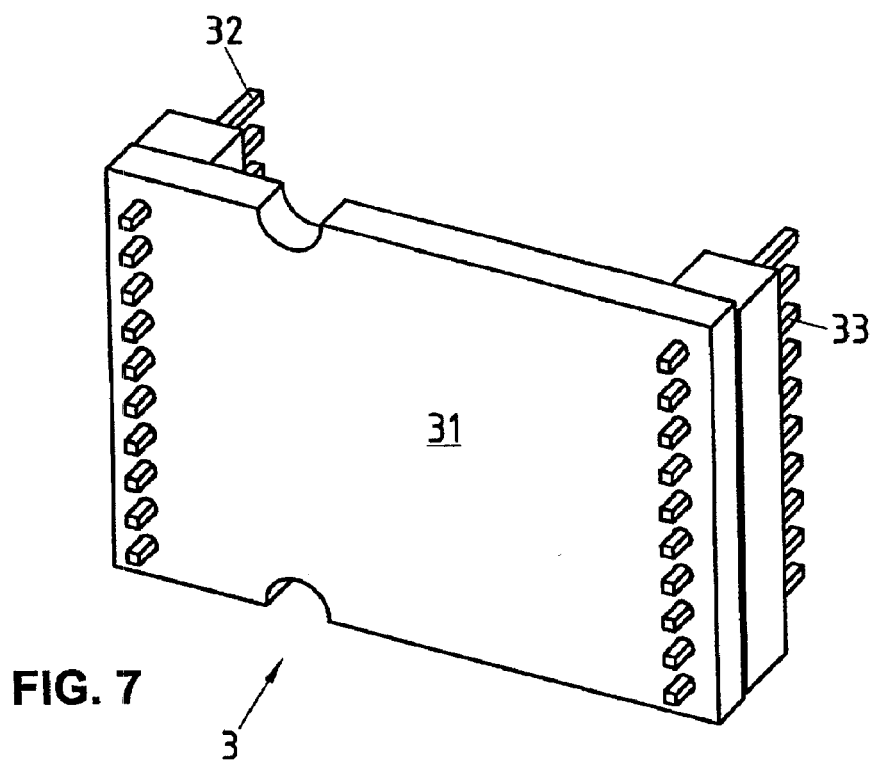
FIG. 7 a perspective representation of a connecting element according to the invention, illustrated without its plastic housing.

FIG. 7 shows a perspective representation of a connecting element 3 used in an acquisition system according to the invention, shown in this Figure without its plastic housing. The connecting element comprises a first series of pins 32 designed to be plugged in a first module and a second series of pins 33 designed to be plugged in an adjacent module. The two series of pins are connected by a printed circuit board (PCB) 31 comprising a certain number of paths (not shown) for interconnecting the two series of pins; different passive electronic components, for example capacitors, can further be mounted on the circuit 31. In the case of a terminating connecting element, a terminating resistance can further be soldered between one and several pins 32 or 33 and the earth. In this case, the PCB can possibly occupy a surface greater than that of an intermediate connecting element 3.

Figure 8:
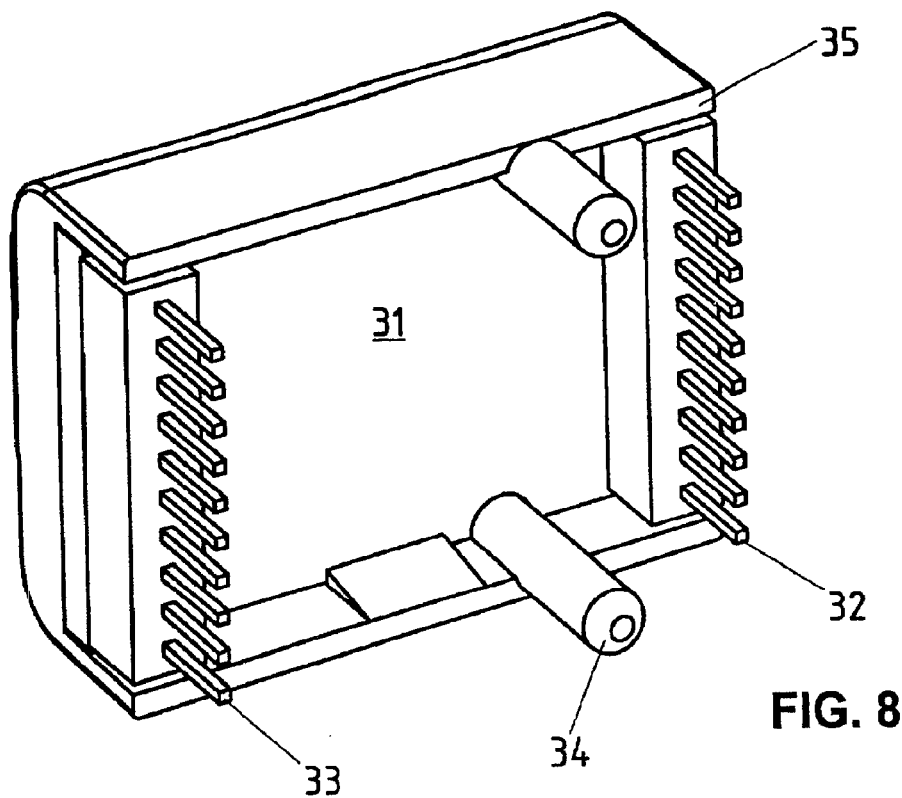
FIG. 8 a perspective representation of a connecting element according to the invention, with its plastic housing.

FIG. 8 shows a perspective representation of a connecting element 3 used in an acquisition system according to the invention, provided with a plastic housing 35 clipped on the PCB 31. The plastic housing 35 includes a polarizing element constituted by two protruding portions 34 designed to be plugged in corresponding openings 111 (FIG. 6) on the corresponding module, so as to prevent the connecting elements from turning and from being inserted the wrong way.

In the case of acquisition modules occupying more than one slot, for example of modules whose thickness requires two adjacent slots of the acquisition system, connecting elements of double length (not shown) will be used. Similarly, connecting elements for connecting modules placed in different baskets can also be conceived in the framework of this invention. The more substantial phase-shift introduced by the transmission of external synchronization signals and of trigger signals on these connecting elements will then be compensated by an appropriate programming of the delays in the delay lines 206 on the different modules.

What is claimed is:

1. Data acquisition module for modular data acquisition system, comprising:
   connecting means on a first side for removably inserting the module in a slot of said modular acquisition system,
   at least one acquisition channel, each channel comprising at least one analog input and at least one analog-to-digital converter for converting an analog input signal of said analog input into a digital signal,
   at least one clock generating circuit capable of supplying an internal clock signal,
   wherein at least one connector, different from said connecting means, makes it possible to plug in a removable connecting element on a second external side of said module different from the first side in order to connect said module to a synchronization bus connecting several modules in said system, said connection being effected independently from the insertion of said module into said slot,
   and wherein a clock selecting circuit allows the selection of either a slave-clock state, in which said converters are synchronized by said synchronization bus, or of a master-clock state in which these converters are synchronized by said internal clock signal that is also used as external synchronization signal on said synchronization bus.

2. The module of claim 1, wherein said clock generating circuit comprises a phase lock loop (PLL), a clock reference signal being applied at the input of said PLL,
   and wherein said internal clock signal is a signal downstream of said PLL.

3. The module of claim 1, wherein a delay element enables the external synchronization signal received from the synchronization bus to be delayed.

4. The module of claim 3, wherein the delay applied by said delay element can be programmed.

5. The module of claim 1, wherein said connector comprises a trigger input for transmitting at least one trigger signal between adjacent modules.

6. The module of claim 5, wherein at least one trigger generating circuit enables a trigger signal to be generated in response to a predefined event on one of the acquisition channels.

7. The module of claim 6, wherein a trigger selecting circuit makes it possible to impose on said synchronization bus the trigger signal supplied by said trigger generating circuit.

8. The module of claim 1, wherein said external synchronization signal can momentarily be interrupted.

9. The module of claim 8, wherein said external synchronization signal can be interrupted according to the state of said trigger signal.

10. The module of one of the preceding claims, wherein said clock selecting circuit can be controlled by signals applied on said connecting means.

11. The module of claim 5, wherein said delay element can be controlled by signals applied on said connecting means.

12. The module of claim 7, wherein said trigger selecting circuit can be controlled by signals applied on said connecting means.

13. The module of claim 1, wherein said connector makes it possible to simultaneously plug in two removable connecting elements enabling said external synchronization signal and/or said trigger signal to be transmitted from or to two adjacent modules in said modular acquisition system.

14. The module of claim 1, wherein at least one acquisition channels comprises:
    at least a demultiplexer for demultiplexing the signal supplied by said analog-to-digital converter,
    at least a memory element for storing the demultiplexed signal supplied by said demultiplexer,
    and wherein said trigger generating circuit is connected at the output of the demultiplexer.

15. The module of claim 1, wherein it conforms to the PCI standard,
    and wherein said connector is placed on said second side on the front of said module that can be accessed by the user when said module is mounted in said modular acquisition system.

16. The module of claim 1, wherein it conforms to the CompactPCI standard,
    and wherein said connector is placed on said second side on the front of said module that can be accessed by the user when said module is mounted in said modular acquisition system.

17. The module of claim 1, wherein it conforms to the PXI standard,
    and wherein said connector is placed on said second side on the front of said module that can be accessed by the user when said module is mounted in said modular acquisition system.

18. The module of claim 1, wherein it conforms to the VXI standard,
    and wherein said connector is placed on said second side on the front of said module that can be accessed by the user when said module is mounted in said modular acquisition system.

19. The module of claim 1, wherein said external synchronization signal is a differential signal.

20. The module of claim 1, wherein said external synchronization signal is a signal of the type ECL.

21. The module of claim 1, wherein several phase-shifted external synchronization signals can be transmitted on said bus.

22. Modular data acquisition system, wherein
    a plurality of modules according to claim 1 are connected two by two by connecting elements comprising each a first series of pins plugged in a connector on said second front side of a first acquisition module and a second series of pins plugged in a connector on said second front side of a second acquisition module.

23. The modular system of claim 22, further comprising a clock module for supplying an external synchronization signal to one or several modules in a modular data acquisition system, wherein said clock module comprises:

connecting means for removably inserting the clock module in a slot of said modular acquisition system, at least one clock generating circuit capable of supplying an external synchronization signal, at least one connector for plugging in a removable connecting element on one of said second external sides of said clock module in order to transmit said external synchronization signal on a bus connecting adjacent modules in said modular acquisition system.

24. The modular system of claim 22, further comprising a trigger module for supplying a trigger signal to one or several modules in a modular data acquisition system, wherein said trigger module comprises:

connecting means for removably inserting the trigger module in a slot of said modular acquisition system, a trigger generating circuit capable of generating a trigger signal in response to a predefined event on an acquisition channel of the modular acquisition system, at least one connector for plugging in a removable connecting element on one of said second external sides of said trigger module in order to transmit a trigger signal on a bus connecting adjacent modules in said modular acquisition system.

25. The modular system of claim 24, wherein said connector makes it possible to simultaneously plug in two removable connecting elements enabling said trigger signal to be transmitted to two adjacent modules in said modular acquisition system.

26. The modular system of claim 24, wherein said trigger module comprises an acquisition channel comprising:

at least an analog-to-digital converter, at least a demultiplexer for demultiplexing the signal supplied by said analog-to-digital converter, at least a memory element for storing the demultiplexed signal supplied by said demultiplexer, and wherein said trigger generating circuit is connected at the output of said demultiplexer.

27. The modular system of claim 22, wherein said removable connecting element comprises:

a printed circuit board comprising a plurality of paths enabling said pins of the first series to be electrically connected with said pins of the second series, at least a protrusion designed to be plugged in one of said acquisition modules so as to prevent said removable connecting element from turning.

28. The modular system of claim 27, wherein said connection element comprises a housing of plastic material encasing said printed circuit board.

29. The modular system of claim 22, wherein it comprises at least one connecting element provided with at least one terminating impedance electrically connected between one of said pins and an earth signal, the value of said terminating impedance being about equal to the line impedance of the signal traveling through the pin in question.

30. The module system of claim 29, wherein the shape of said connecting element with at least one terminating impedance does not allow it to be plugged in between two other connecting elements.

* * * * *